United States Patent [19]

Craig

[11] 4,229,407

[45] Oct. 21, 1980

[54] TEAR PATH PRODUCTS, METHOD AND APPARATUS

[75] Inventor: Brian W. Craig, McHenry, Ill.

[73] Assignee: Baxter Travenol Laboratories, Inc., Deerfield, Ill.

[21] Appl. No.: 14,702

[22] Filed: Feb. 23, 1979

[51] Int. Cl.³ .............................................. B29F 3/08
[52] U.S. Cl. .................................. 264/519; 264/564; 264/210.2; 264/237; 264/289.3; 264/290.2; 264/348
[58] Field of Search .............. 264/519, 520, 348, 237, 264/564, 210.2, 289.3, 290.2; 425/326.1, 72

[56] References Cited

U.S. PATENT DOCUMENTS

| | | | |
|---|---|---|---|
| 3,179,326 | 4/1965 | Underwood et al. | 425/326.1 |
| 3,186,628 | 6/1965 | Rohde | 206/620 |
| 3,320,340 | 5/1967 | Luca | 425/326.1 |
| 3,344,975 | 10/1967 | Stoker, Jr. | 229/51 |
| 3,368,740 | 2/1968 | Rohde | 206/604 |
| 3,535,409 | 10/1970 | Rohde | 425/317 |
| 3,632,716 | 1/1972 | Fairbanks | 264/237 |
| 3,848,035 | 11/1974 | Behr | 264/237 |

*Primary Examiner*—Jeffery R. Thurlow
*Attorney, Agent, or Firm*—H. W. Collins; Paul C. Flattery; Raymond M. Mehler

[57] ABSTRACT

Polymer sheets or films are provided with tear paths that are substantially indistinguishable from the remainder of the polymer sheet or film in outward appearance and in chemical properties. Throughout the tear path, molecular chains of the polymer are oriented generally along a predetermined axis, while the molecular chains of the remainder of the polymer sheet or film are oriented generally differently from said predetermined axis. Such tear paths are typically formed by means of a device that extracts heat from the polymer as it is extruded or otherwise molded, the extraction rate being faster than the rate at which the remainder of the molded polymer is cooled in order to encourage maintenance of the substantially monoaxial orientation of the polymer chains along the tear path when the entire polymer is subsequently blown up or otherwise reoriented. The tear path thus formed will typically have a thickness substantially the same as that of the rest of the completed sheet or film, with the result that the tear path has a strength generally the same as the rest of the sheet along orientations other than those enabling tearing along the preselected path.

12 Claims, 10 Drawing Figures

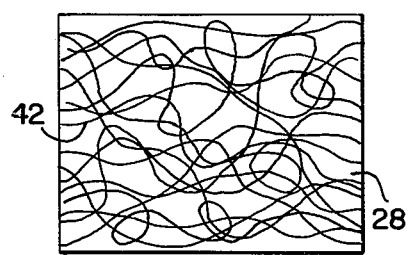
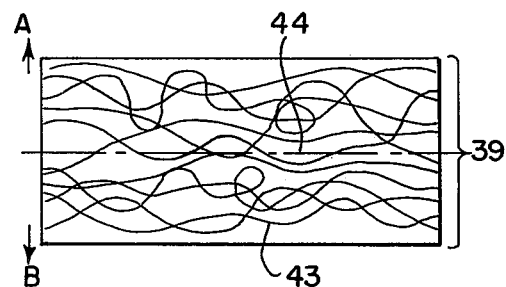
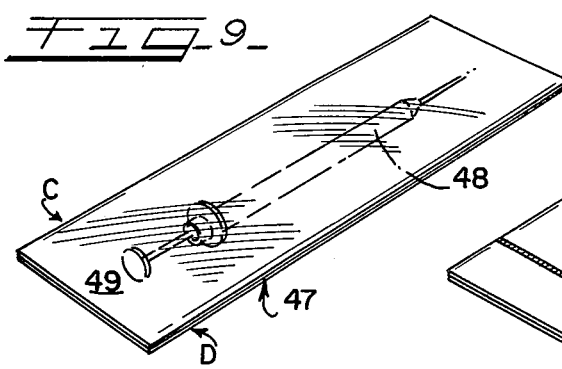
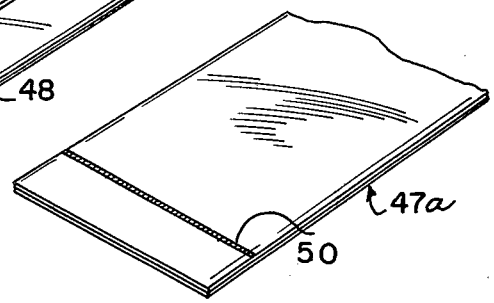
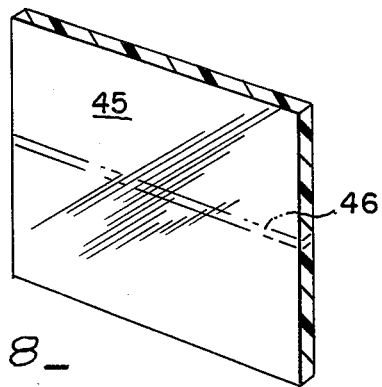

TEAR PATH PRODUCTS, METHOD AND APPARATUS

BACKGROUND AND DESCRIPTION OF THE INVENTION

The present invention relates generally to tear strips within a polymer material, particularly tear strips that are within and continuous with a polymer sheet having molecular chains that were reoriented during formation of the sheet. This invention encompasses an improved product having a tear strip, a method of producing such product, and an improved apparatus by which the product is formed. Tear strips are provided by developing molecular chain orientations along a preselected path which are different from molecular chain orientations in the rest of the sheet.

Heretofore, it has not been known to provide tear paths that are of substantially the same thickness and overall strength as the flexible sheet in which they are located and which are substantially continuous with that sheet. Packaging such as that shown in Rohde U.S. Pat. No. 3,186,628 forms groove lines within the thermoplastic flexible sheet materials by means of a probe projected into the path of the material as it is being extruded or by a heated bar in contact with the thermoplastic material, in either case thinning the material at the tear location. Since such groove lines reduce the thickness of the sheet therealong, they reduce the overall strength of the sheet and of items, such as packages or enclosures, made therewith. Also, when particular enclosures such as bag overpouches for containers of intravenous solution are made of these types of sheet materials, the thickness of the material throughout the enclosure can be important, inasmuch as rates of fluid passage through the material, such as water vapor transmission and gas permeability, will increase as material thickness decreases.

Representative of other approaches in this area are Rohde U.S. Pat. Nos. 3,368,740 and 3,535,409 which show tear lines being formed by coextruding two thermoplastic materials of different character, one of the extrusions being in the nature of a very narrow band which serves as a severance means. By this approach, there is formed a multiple-part sheet rather than the strong, continuous or single-part sheet according to the present invention, even though tear lines made in accordance with this prior approach are said to be able to be formed to the same thickness as the other parts of the sheet.

Forming a tear path either by reducing the thickness of the sheet thereat or by coextruding a separate tear strip insert with the sheet increases the possibility of developing leaks at the tear strips and of reducing the integrity of packages prepared therewith. It is therefore desirable to provide filming or sheeting having a tear path that is both substantially the same thickness as the rest of the sheet and is a continuous part thereof in order to thereby decrease the total, overall strength of the film or sheet to a very limited extent while at the same time provide a path for tearing the material at a predetermined location.

Features of this type are realized according to the present invention by fixing the generally axial molecular chain orientation pattern developed as the films or sheets are extruded and before the molecular chains are reoriented, while avoiding any significant change in the thickness of the sheet or film. In general, this is accomplished by rapidly extracting heat at a relatively small area near the location at which the sheet is extruded and before the location at which it is reoriented in order to form a tear path as the sheet is extruded.

It is accordingly a general object of the present invention to provide a sheet having an improved tear path therein.

Another object of the present invention is to provide a method, product, and apparatus that are improved in connection with a tear strip or path that is continuous with the rest of the film or sheet.

Another object of this invention is an improved method, product, and apparatus which provide an easy opening access path that has strength characteristics that are substantially uniform throughout the product and resists leakage when sterilized.

Another object of this invention is an improved enclosure product, and a method and means for producing an enclosure product, having a tear path that the unaided eye cannot distinguish from the rest of the enclosure unless the path is supplementarily marked.

Another object of the present invention is a method, apparatus, means, and product produced thereby which provide a polymer film or sheet having a path including polymer molecular chains oriented generally in-line with respect to each other, the in-line orientation being significantly different from the relative locations of the remaining film molecular chains with respect to each other.

Another object of the present invention is a method, means, apparatus and product produced thereby which include freezing or otherwise fixing a preselected pathway within a sheet of polymer material.

Other objects of the present invention will be apparent from the following detailed description, taking in conjunction with the accompanying drawings wherein:

FIG. 6 is a schematic illustration of polymer molecular chain structure for a typical polymer that is generally unoriented;

FIG. 7 is a schematic illustration of polymer molecular structure such as shown in FIG. 6 after the molecular chains have been oriented axially;

FIG. 8 is a perspective view of a sheet according to this invention, showing a tear path in phantom;

FIG. 9 is a perspective view of an enclosure made in accordance with this invention having an unmarked tear path not noticeable to the unaided eye; and FIG. 10 is an enlarged detail view of the enclosure of FIG. 9 partially broken away and to the tear path of which a marking has been added.

Figure 1:
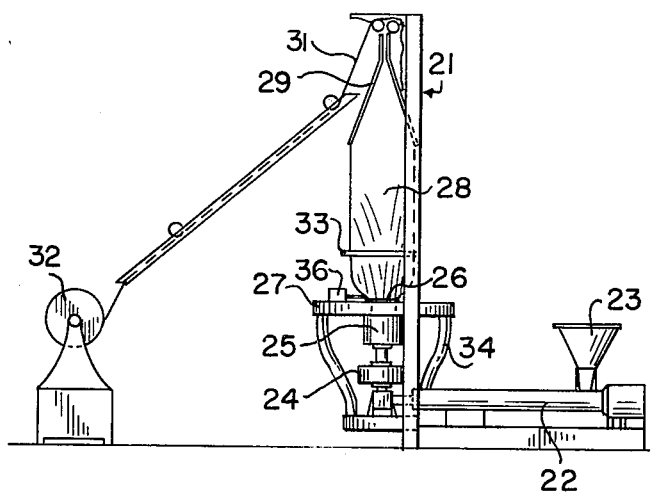
FIG. 1 is an elevational view of a blow molding apparatus that has been improved according to the present invention.

A typical apparatus according to the present invention is shown generally in FIG. 1: the particular apparatus shown is one for forming a blown-film and is generally designated 21. Such an apparatus 21 will typically include an extruder means 22 into which polymer is introduced through a hopper 23. Extruder means 22 passes the polymer to its molten state, usually by raising the polymer to a specific predetermined temperature, the molten polymer being extruded for further processing in a die means 24 havng a blown-film head 25 including a die lip 26. An air quenching means 27 provides extensive air throughput for guiding the film cylinder 28 being blown up and moved upwardly. A film collapsing means 29 collapses the film cylinder 28 upon itself after it has been suitably cooled, the collapsed film 31 being collected on a spool means 32 or the like.

Figure 2:
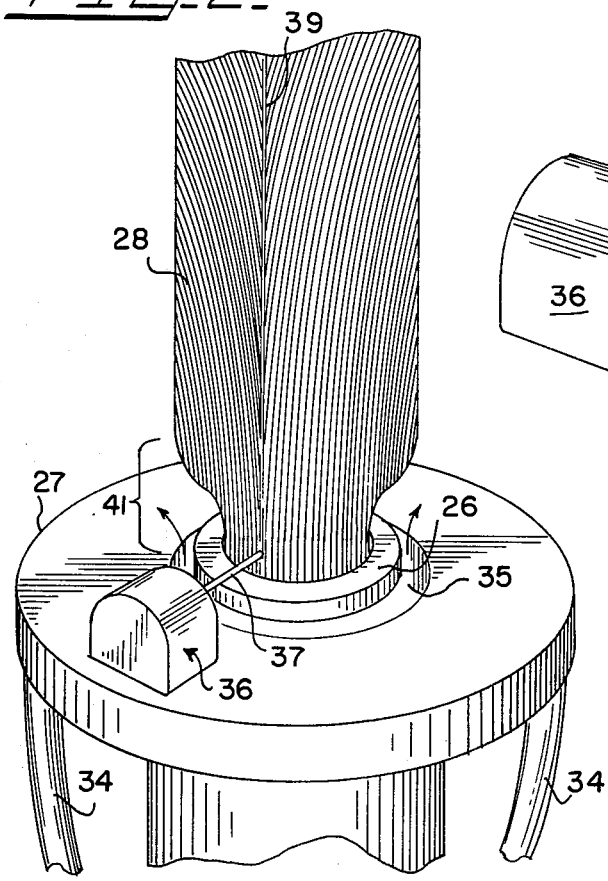
FIG. 2 is an enlarged view, in perspective, of a portion of FIG. 1 and includes a schematic illustration of the molecular chain orientation of products according to this invention.

Further details of the illustrated apparatus can be seen from FIG. 2. Lip 26 of the die means 24 is generally ring-shaped, while the die means 24 transforms the extruded molten polymer into a molten polymer cylinder. Means 24 can be of a type that continuously rotates and has a spiral distribution channel for providing generally uniform formation and passage of the molten polymer cylinder. Air quenching means 27 cools the polymer cylinder, which cylinder is then blown-up to reorient the polymer film cylinder 28 for adding a generally horizontal axial character to the substantially vertical axial orientation of the film cylinder 28 when it leaves the die means 24. The operation of the apparatus, including the spool means 32, is usually synchronized to impart a vertical tension along the upwardly moving film cylinder 28.

Air quenching means 27 optionally may include an air ring 33 which cooperates with the rest of the air quenching means 27 in order to enhance cooling gas throughput to on the order of 60 cubic meters per minute. Typically, by the time the film cylinder 28 reaches the air ring 33, the film has reached its frost point, at which stage it will be solidified enough to maintain the dimension and configuration of the film cylinder 28 at that location. Generally, cooling gas enters air quenching means 27 through inlet conduits 34 and exits means 27 through an air deflector collar 35 to pass upwardly along the film cylinder 28.

Heat dissipating means, generally designated 36, is located substantially immediately downstream of the die lip 26 so that its heat extracting conduit 37, having a contact area 38, just touches the outside surface of the film cylinder 28 emerging from the die lip 36. Means 36 will typically include a hollow metal shaft that has exceptional thermal conductivity, the shaft preferably having a longitudinal bore containing a very highly thermally conductive fluid, usually a gas or mixture of gasses. In essence, the heat extracting conduit 37 permits for very rapid cooling of a narrow portion of polymer emerging from the die lip 26 and upstream of a blow-up section 41 along the film cylinder 28, this rapid heat dissipation or cooling having been found to result in a "freezing" of the generally axial or linear molecular chain orientation that is characteristic of film cylinder 28 as it emerges from the die lip 26.

Figure 4:
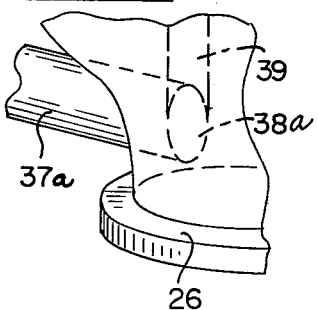
FIG. 4 is a perspective view similar to FIG. 3, partially broken away, wherein the heat dissipation means has a generally oval cross-section.
Figure 5:
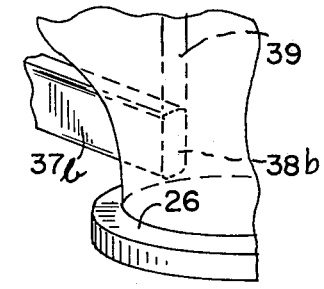
FIG. 5 is another perspective view similar to FIG. 3, partially broken away, wherein the heat dissipating means has a generally rectangular cross-section.

An especially preferred heat extracting conduit 37 is very thin-walled in order to hold as much highly conductive fluid as possible for each unit of the contact area 38. Heat extracting conduit 37 illustrated in FIG. 3 has a generally circular cross-section, while heat extracting conduits 37a and 37b depicted in FIGS. 4 and 5 have generally oval and generally rectangular cross-sections, respectively, which latter two configurations offer the advantage of forming a relatively narrow tear path along the film cylinder 28 while at the same time providing additional contact area 38a, 38b for added heat extraction capabilities that are available for forming the tear path.

Figure 3:
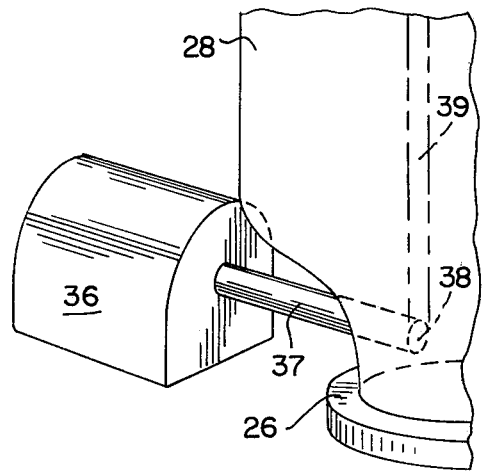
FIG. 3 is a perspective view similar to FIG. 2, further enlarged, showing additional details of this invention, and depicting an embodiment wherein the heat dissipating means has a generally circular cross-section.

The tear path formed in accordance with this invention is illustrated schematically in FIG. 2 and is shown in phantom in FIG. 3 at 39. With particular reference to FIG. 2, the general orientation pattern of the polymer molecular chains is schematically illustrated therein, the molecular orientation of the polymer cylinder 28 emerging from the die lip 26 being generally linear or substantially parallel to the axis of film cylinder 28, illustrated by the approximately vertical lines immediately above or downstream of the die lip 26. Heat dissipating means 36 substantially maintains this linear orientation along the tear path 39, while the film cylinder 28 is increased in diameter in expansion or blow-up section 41, with the result that the molecular chains of the film cylinder 28, except those along tear path 39, are reoriented from their linear, generally vertical alignment to a more diverse, non-linear or biaxial alignment, as illustrated schematically above the section 41 in FIG. 2. Once film cylinder 28 passes through expansion section 41, all portions thereof except the tear path 39 develop an orientation that is much more random and much less in-line than that of the film when it emerges from the die lip 26. Tear path 39 in the finished polymer sheet provides a location that has its chains lined up generally parallel to each other so that a minimal number of the chains have to be broken in order to tear a pathway that is substantially parallel to the axially aligned molecular chains. Off of the tear path 39, substantial chain breakage would be needed in order to tear a strip through the film or sheet.

FIG. 6 depicts very schematically a type of random molecular chain network 42 that might be found in those portions of the film cylinder 28 that are not along the tear path 39, while FIG. 7 schematically illustrates the tear path 39, having molecular chains 43 that are generally linearly or axially oriented. Because of the generally linear arrangement of the chains 43, there is less intertwining of and crosslinking between the chains 43 than in the network 42, with the result that forces applied substantially perpendicularly to the generally common axis 44 of the molecular chains 43, the substantially perpendicular forces being illustrated by arrows A and B in FIG. 7, will tend to separate the polymer sheet between the molecular chains 43 and generally along the axis 44.

FIGS. 8, 9 and 10 illustrate the type of products that are made according to this invention. FIG. 8 shows a sheet 45 of polymer material that has been reoriented after its initial extrusion, such as the reorientation exhibited by a sheet of blown-film made on the illustrated apparatus or other film that is made by sheet extrusion or the like and which includes a subsequent reorientation of the molecular chains of the polymer prior to the stage at which a polymer material is set. Sheet 45 includes a tear path 46 that is illustrated in phantom in FIG. 8. To the unaided eye, the tear path 46 has the same general appearance as the rest of the sheet 45, and is of substantially the same thickness of the remainder of sheet 45. Typically, in order to assist the user in locating the tear path 46, it will be marked with suitable coloration or the like either completely therealong or at intermittent locations such as at one or more ends of the tear path 46.

In another aspect of this invention, an enclosure or package 47, which can contain a device 48, for example the illustrated syringe, includes a tear path according to this invention. Enclosure 47 has a tear path that is not visible to the unaided eye, located in FIG. 9 between arrows C and D, making it possible to rip the end 49 from the rest of the package 47 by grasping the package on both sides of arrow C or of arrow D and applying a tearing or a snapping force. In FIG. 10, a similar package 47a is shown with a tear path designation or marking 51 which enables the user to readily locate the tear path before exerting the tearing forces.

With specific regard to the method aspect of this invention, a tear path is formed within a material by rapidly extracting heat away from an extruded material at a location having a relatively small area before the material as a whole is reoriented by being blown up, stretched, expanded or otherwise modified from an initial, generally axial or linear orientation to a subsequent, more diverse orientation.

Selecting materials for processing according to this invention includes choosing a material having generally longchain molecules capable of being oriented with respect to each other as they are setting into sheets or films. Typically, these will be thermoplastic polymers, especially those having relatively long, irregular chains which are capable of being oriented and which are also capable of being blow-molded, sheet extruded, or the like. Included are polyolefins, polyesters, vinyl polymers, and elastomeric materials. Specific examples include high density polyethylene, low density polyethylene, polypropylene, polystyrene, and polyvinyl chloride. Found to be especially preferred is high density polyethylene, sometimes referred to as linear polyethylene. Such materials will, generally speaking, have a susceptibility to orientation upon extrusion and to subsequent reorientation by virtue of the presence of "crystallite" structures therein that are in the nature of unlinked, or weakly bonded molecular chains that can be readily changed in orientation with respect to each other while the material is in a molten or semi-molten state. In a general sense, materials according to this invention are capable of being oriented generally monoaxially and also generaly biaxially.

Most polymers processable according to the present invention will be in a generally molten state as they flow out of a blown-film or other type of die, after which they can be cooled to pass through their respective glass transition temperatures at which the particular polymer is pliable enough to stretch but not molten enough to flow. Upon continued cooling, the polymers will reach their respective frost points at which the particular polymer sets up and holds its dimension. For any given polymer, the frost point temperature will be lower than the glass transition temperature. The axial orientation along the tear path is maintained throughout the time that the polymer passes from the molten state to its glass transition temperature, and on to its frost point, after which substantially all of the reorientation will have been completed outside of the tear path.

Polymers processed according to this invention typically will shrink generally longitudinally as they are cooled, whether the cooling is along the predetermined tear path location or that of the body of the film cooling from the molten state to the frost point. This shrinking cooperates with the rate at which the film cylinder is removed from the die in order to impart a pulling force or tension on the cooling or solidifying polymer to stretch the polymer longitudinally. Since, in general, the tear path location is frozen or solidified before the rest of the film is, this point tends to shrink before the rest of the polymer film, which tends to thicken the tear path location with respect to the rest of the polymer film, which thickening is usually eliminated when the entire film is blown up or otherwise stretched in a lateral or other nonlongitudinal direction.

Included in the method is an initial orienting of the selected material as it is passed from a molten state to a solidifying state, followed by a change in the initial orientation of all but a selected pathway in the material before it solidifies, the pathway developing into the tear path according to this invention. Usually the change in orientation is accomplished by stretching the material in multiple directions by blowing up a cylinder of the material or otherwise expanding the film in directions different from the initial orientation while it is setting.

In the preferred embodiment, the material is treated by steps including those of a blown-film process. Molten, extruded polymer material is shaped into a polymer film cylinder having molecular chains that are generally axially oriented, which cylinder is cooled so as to develop a solidifying cylinder. A selected portion of the solidifying film cylinder is subjected to a treating step in order to maintain its generally axial orientation while the solidifying film cylinder is increased in diameter by blowing up the cylinder with a fluid such as air. By proceeding with these steps, the step of maintaining the generally axial orientation forms a tear path within the cylinder, while the diameter increasing step imparts a biaxial or multi-axial molecular chain reorientation or disorientation to the film cylinder that is not accomplished along the preselected tear path.

The treating step itself preferably includes rapidly dissipating heat from the polymer when it is at a temperature between that at which it is molten and its frost point. This rapid cooling should be accomplished by means of a surface of relatively small area that just touches the surface of the polymer film being molded. One particularly advantageous procedure for accomplishing this rapid heat removal is to contact the polymer film surface with the "point" of a narrow tube or conduit for rapidly transferring or conducting heat away from the hot surface of the polymer and to a heat sink at a lower temperature, such as a chilled water supply, that provides a depository for heat at the tear path location to thereby "freeze" the orientation at the tear path location by quickly removing heat from the tear path location. Suitable heat transference will be accomplished when the thermal conductivity developed is more than three magnitudes greater than that of a very conductive metal such as copper.

Heat dissipation may be accomplished by any other suitable "cooling" procedure, such as providing liquid nitrogen in a narrow gas jet to contact the tear path location. However the heat dissipation is carried out, the rate of heat dissipation should be no lower than about 3 BTU per minute for a unit circular film-contacting surface area of a ¼ inch diameter, or generally equivalent surface area, approximately 0.048 square inches. Generally speaking, any greater rate of heat dissipation will be suitable for use in accordance with this invention, but from the point of view of the practical limits of presently available heat dissipating means, the maximum rate under ideal heat conduction conditions will be about 12 BTU per minute for this unit surface area. Taking current technology into consideration, an acceptable and attainable preferred range is between about 5 and about 9 BTU per minute for this unit surface area.

It is generally advantageous to have as small a film-contacting surface area as possible, because an area that is too large runs the risk of excessively shrinking the material being treated along the tear path location and forming a tear path that tends to be slightly thicker than the rest of the polymer material when the product is completely cooled. In general, it is desirable to use as small a surface area as possible that will extract as much heat as possible. Heat extracting surface areas smaller than the unit surface area are more difficult to construct. Circular film-contacting surface areas having a diameter of about ⅛ inch, or the generally equivalent surface area of about 0.012 square inch would, as an approximation, require fewer BTU per minute than needed for the unit surface area, the range being approximately one-half of that for the unit or ¼ inch diameter surface area. As an example, a preferred heat extraction rate range for an ⅛ inch diameter surface area would be between about 2 and about 5 BTU per minute. All of these heat extraction rates are understood to be measured generally at the operating temperatures in accordance with this invention, typically between about 300° and 400° F. at the film-contacting surface when the preferred polymers are used, although the preferred heat extracting means is capable of operating between 40° and 600° F.

With further regard to the preferred embodiment incorporating a blown-film procedure, the die means used to shape the molten polymer into a film cylinder should have a relatively small diameter. For example, a preferred means will be one that forms a film cylinder having an initial diameter of approximately 2-½ inches and that blows up the film cylinder diameter to between about 4-½ and 6-½ inches. While a less extensive degree of blow-up relative to the initial cylinder diameter is operable, such a less extensive blow-up would reorient to a smaller degree, thereby reducing the relative differences between the axial orientation along the tear path and the modified orientation on the rest of the film or sheet, with the result that the tear path formed typically will not be as readily or as accurately torn.

It will be apparent to those skilled in this art that the present invention can be embodied in various forms; accordingly, this invention is to be construed and limited only by the scope of the appended claims, including appropriate equivalents to features specified therein.

I claim:

1. A method of forming a tear path within a molded material, comprising:
    selecting a material having molecular chains capable of being oriented with respect to each other as the material is solidifying;
    shaping said material into a solidified form, said shaping including cooling said material and reorienting said molecular chains, said shaping step including initially orienting said molecular chains generally axially and said reorienting step including changing said generally axial orientation; and
    treating a predetermined location on said solidifying material during such shaping, said treating step including dissipating heat at a rate faster than the rate at which said material is cooling, said heat dissipating rate being fast enough to significantly reduce said reorienting of the molecular chains during the shaping step to establish a tear path at said predetermined location, said treating step including rapidly extracting heat from said solidifying material when it is at a temperature between its frost point and the temperature at which the material is molten, said heat dissipating step including touching the surface of said material with a highly thermally conductive narrow contact area.

2. The method of claim 1, wherein said tear path is substantially continuous with the solidified material.

3. The method of claim 1, wherein said tear path is substantially no thinner than the solidified material.

4. The method of claim 1, wherein said shaping step includes forming a solidifying polymer film cylinder having said molecular chains that are generally axially oriented and blowing up said solidifying polymer film cylinder.

5. The method of claim 1, wherein said shaping step includes blowing up a solidifying film cylinder by increasing its diameter.

6. A method of forming a tear path within a molded material, comprising:
    selecting a material having molecular chains capable of being oriented with respect to each other as the material is solidifying;
    shaping said material into a solidified form, said shaping including cooling said material and reorienting said molecular chains, said shaping step including initially orienting said molecular chains generally axially and said reorienting step including changing said generally axial orientation; and
    treating a predetermined location on said solidifying material during such shaping, said treating step including dissipating heat at a rate faster than the rate at which said material is cooling, said heat dissipating rate being fast enough to significantly reduce said reorienting of the molecular chains during the shaping step to establish a tear path at said predetermined location, said heat dissipating step including touching the surface of said material which a contact area of a narrow cylinder having a thermal conductivity at least one thousand times greater than the thermal conductivity of copper.

7. The method of claim 1, wherein said heat dissipating step extracts heat at a rate of at least 2 BTU per minute.

8. A method of forming a tear path within a molded material, comprising:
    selecting a material having molecular chains capable of being oriented with respect to each other as the material is solidifying;
    shaping said material into a solidified form, said shaping including cooling said material and reorienting said molecular chains, said shaping step including initially orienting said molecular chains axially and said reorienting step including changing said generally axial orientation; and
    treating a predetermined location on said solidifying material during such shaping, said treating step including dissipating heat at a rate faster than the rate at which said material is cooling, said heat dissipating rate being fast enough to significantly reduce said reorienting of the molecular chains during the shaping step to establish a tear path at said predetermined location, said heat dissipating step including extracting heat at a rate of at least about 3 BTU per minute for a contact surface having an area substantially equivalent to that of a circle having a ¼-inch diameter.

9. A method of forming a tear path within a molded material, comprising:
   selecting a material having molecular chains capable of being oriented with respect to each other as the material is solidifying;
   shaping said material into a solidified form, said shaping including cooling said material and reorienting said molecular chains, said shaping step including initially orienting said molecular chains generally axially and said reorienting step including changing said generally axial orientation; and
   treating a predetermined location on said solidifying material during such shaping, said treating step including dissipating heat at a rate faster than the rate at which said material is cooling, said heat dissipating rate being fast enough to significantly reduce said reorienting of the molecular chains during the shaping step to establish a tear path at said predetermined location, said heat dissipating step including extracting heat at a rate between about 5 to about 9 BTU per minute for a contact surface having an area substantially equivalent to that of a circle having a ¼-inch diameter.

10. A method of forming a tear path within a molded material, comprising:
    selecting a material having molecular chains capable of being oriented with respect to each other as the material is solidifying;
    shaping said material into a solidifying form, said shaping including cooling said material and reorienting said molecular chains, said shaping step including initially orienting said molecular chains generally axially and said reorienting step including changing said generally axial orientation; and
    treating a predetermined location on said solidifying material during such shaping, said treating step including dissipating heat at a rate faster than the rate at which said material is cooling, said heat dissipating rate being fast enough to significantly reduce said reorienting of the molecular chains during the shaping step to establish a tear path at said predetermined location, said heat dissipating step including extracting heat at a rate between about 2 and about 5 BTU per minute for a contact surface having an area substantially equivalent to that of a circle having a ⅛-inch diameter.

11. The method of claim 1, wherein said treating step is carried out with said material being at a temperature below a temperature at which the material is molten.

12. The method of claim 1, wherein said shaping step includes blowing up a cylinder of said material to at least twice its initial diameter.

* * * * *